United States Patent
Bonachea

(10) Patent No.: US 11,296,542 B2
(45) Date of Patent: **\*Apr. 5, 2022**

(54) METHOD OF IDENTIFYING WHEN TO INITIATE CONTROL SEQUENCES

(71) Applicant: ASCO Power Technologies, L.P., Florham Park, NJ (US)

(72) Inventor: Victor E. Bonachea, Elmwood Park, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/155,682

(22) Filed: Jan. 22, 2021

(65) Prior Publication Data
US 2021/0143669 A1 May 13, 2021

Related U.S. Application Data

(62) Division of application No. 15/179,500, filed on Jun. 10, 2016, now Pat. No. 10,910,873.

(51) Int. Cl.
*H02J 9/06* (2006.01)
*H02J 3/00* (2006.01)
*H02J 3/42* (2006.01)
*H02J 3/08* (2006.01)

(52) U.S. Cl.
CPC ............... *H02J 9/06* (2013.01); *H02J 3/001* (2020.01); *H02J 3/08* (2013.01); *H02J 3/42* (2013.01)

(58) Field of Classification Search
CPC ...... H02J 9/06; H02J 3/001; H02J 3/08; H02J 3/42

USPC .......................................................... 307/64
See application file for complete search history.

(56) References Cited

U.S. PATENT DOCUMENTS

| | | |
|---|---|---|
| 6,700,351 B2 | 3/2004 | Blair et al. |
| 7,816,815 B2 | 10/2010 | Siciliano et al. |
| 8,508,890 B2 | 8/2013 | Zheng et al. |
| 8,519,745 B2 | 8/2013 | Scholder |

(Continued)

OTHER PUBLICATIONS https://www.school-for-champions.com/science/ac_world_volt_freq.htm#.Xm-qLPIKjmE https://web.archive.org/web/20050616074207/https://www.school-for-champions.com/science/ac_world_volt_freq.htm) (Year: 2005).

*Primary Examiner* — Alfonso Perez Borroto
(74) *Attorney, Agent, or Firm* — Locke Lord LLP

(57) ABSTRACT

A method and system are provided for transferring a load between a primary power source and a secondary power source. In accordance with the disclosure, a controller senses, via a sensor, an electrical signal providing power from the primary power source to the load. The controller also detects a non-conforming power event by determining that a parameter of the electrical signal is either more or less than a first threshold value. Responsive to the detection of the non-conforming power event, the controller determines a quantity of non-conforming power events that occur during a first time interval. The controller further can compares the determined quantity of non-conforming power events to a second threshold value. Responsive to the determined quantity of non-conforming power events being either greater or lesser than the second threshold value, the controller initiates a control signal, such as a control signal to initiate a load transfer.

20 Claims, 4 Drawing Sheets

(56) References Cited

U.S. PATENT DOCUMENTS

| | | | |
|---|---|---|---|
| 9,250,274 B2 | 2/2016 | Hayes et al. | |
| 9,414,469 B2* | 8/2016 | Chen | H05B 45/385 |
| 9,655,176 B2* | 5/2017 | Van Der Veen | H05B 45/44 |
| 9,872,348 B2* | 1/2018 | Arulandu | H05B 45/48 |
| 10,091,861 B2 | 10/2018 | Usui et al. | |
| 10,461,573 B2 | 10/2019 | Frankland et al. | |
| 2008/0088241 A1* | 4/2008 | Chen | H05B 45/355 |
| | | | 315/88 |
| 2012/0235512 A1 | 9/2012 | Siciliano et al. | |
| 2013/0099566 A1 | 4/2013 | Pfitzer et al. | |
| 2014/0246910 A1 | 9/2014 | Ibrahim et al. | |
| 2015/0115719 A1 | 4/2015 | Siciliano et al. | |
| 2015/0155743 A1 | 6/2015 | Noguchi | |
| 2015/0214785 A1* | 7/2015 | Jagjitpati | H02J 7/0072 |
| | | | 307/66 |
| 2015/0223303 A1* | 8/2015 | Hsia | F21K 9/27 |
| | | | 315/121 |

* cited by examiner

METHOD OF IDENTIFYING WHEN TO INITIATE CONTROL SEQUENCES

BACKGROUND

Unless otherwise indicated herein, the materials described in this section are not prior art to the claims in this application and are not admitted to be prior art by inclusion in this section.

Various applications require a nearly constant supply of reliable electrical power to operate effectively. For example, hospitals may require a constant and reliable supply of electricity to ensure medical equipment in operating rooms and the like function when needed. Further, food retailers such as supermarkets and grocery stores may require a constant and reliable supply of electricity to properly operate refrigeration systems associated with display cases and freezers to prevent food spoilage.

While utility companies generally provide electrical power consistently and reliably, such power is sometimes interrupted due to inclement weather, unforeseen accidents, or maintenance. Electrical power consumers seeking to mitigate or avoid even minor interruptions in their power supply often rely on generators and other backup systems to supply electrical power during periods when electrical service from a utility company is interrupted. Transfer switches enable these consumers to switch between a primary electrical source (e.g., from a utility company) and a secondary electrical source (e.g., a generator or other backup system) when one source becomes unreliable or requires maintenance.

SUMMARY

According to aspects of the disclosure, a method and system are provided for transferring a load between a primary power source and a secondary power source. In accordance with the disclosure, a controller senses, via a sensor, an electrical signal providing power from the primary power source to the load. The controller detects a non-conforming power condition or event. For example, such a non-conforming condition or event may be related to an under or over voltage event, an under or over current event, an harmonic content related event, a power (kW) related event, a voltage or current balance related event, a k factor related event, a crest related event and/or other similar power related parameters.

In one preferred arrangement, the controller detects the non-conforming power event by determining that a parameter of the electrical signal is less than or greater than a first threshold value and, responsive to the detection of the non-conforming power event, the controller determines a quantity of non-conforming power events that occur during a first time interval. The controller further compares the determined quantity of non-conforming power events to a second threshold value. Responsive to the determined quantity of non-conforming power events being greater than the second threshold value, the controller may generate a general control signal. As just one example, such a control signal may initiate a control sequence to transfer the load from the primary power source to a secondary power source. Alternatively, the controller may initiate a control sequence to transfer the load from a secondary power source to a primary power source.

The foregoing and additional aspects and implementations of the present disclosure will be apparent to those of ordinary skill in the art in view of the detailed description of various embodiments and/or aspects, which is made with reference to the drawings, a brief description of which is provided next.

Figure 1:
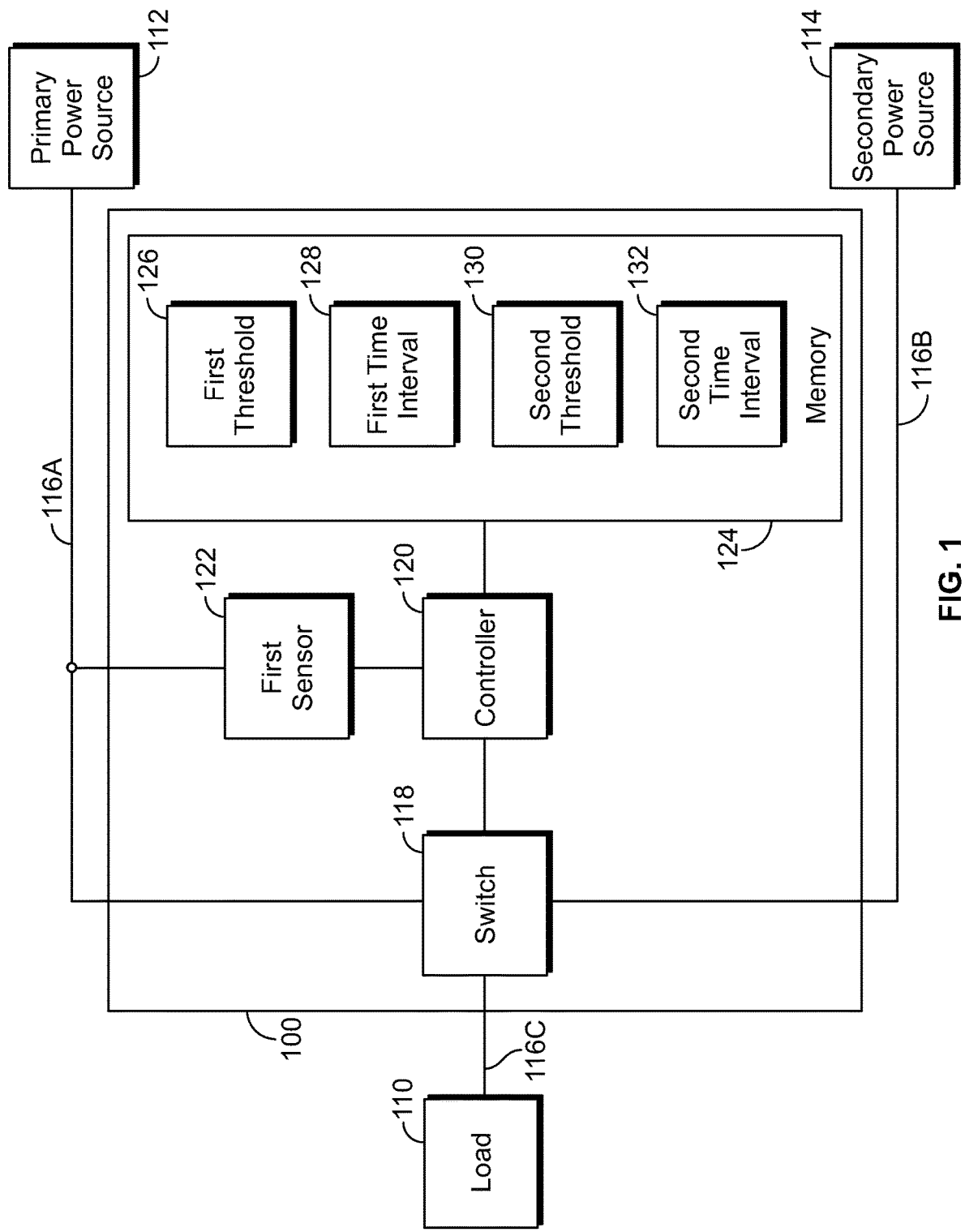
FIG. 1 is a block diagram of an automatic transfer switch according to an example of the disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the invention is to cover all modifications, equivalents, and alternatives falling within the spirit and scope of the present disclosure.

DETAILED DESCRIPTION

I. Overview

Conventional transfer switches may detect a power outage condition for a primary power source and then responsively transfer a load from the primary power source to a secondary power source. Such conventional transfer switches may not be able to detect other types of conditions, which indicate that the primary power source is currently or may imminently experience an outage or other problem. The automatic transfer switches of the present disclosure can advantageously detect and/or predict instability in the power provided by the primary power source and then responsively transfer the load from the primary power source to the secondary power source. This may, among other things, beneficially facilitate automatically switching to a secondary power source before the primary power source experiences an outage.

II. Example System

Referring now to FIG. 1, a block diagram of an automatic transfer switch 100 is depicted. The transfer switch 100 selectively couples a load 110 to either a primary power source 112 or a secondary power source 114. In an example, the primary power source 112 can be provided by a power utility (e.g., via the electric grid) and the secondary power source 114 can be provided by a backup generator. In other examples, the primary power source 112 and/or the secondary power source 114 can be other types of power supplies (e.g., a battery). For instance, in an alternative example, the primary power source 112 can be a renewable energy power generation system (e.g., a wind power system, a hydroelectric power generation system, a solar power generation system, etc.), which is onsite at the load 110, and the secondary power source 114 can be a power utility.

As shown in FIG. 1, the primary power source 112 is coupled to the transfer switch system 100 via a primary conductor 116A, the secondary power source 114 is coupled to the transfer switch system 100 via a secondary conductor 116B, and the transfer switch system 100 is coupled to the load 110 via an output conductor 116C. In general, the primary power source 112 and the secondary power source 114 can provide electric power in the form of an electric signal. In particular, for example, the electric signal can be an alternating current (AC) voltage signal.

While the power sources 112, 114, the conductors 116A-116C, and the load 110 are shown as a single-phase system in FIG. 1, other configurations can be utilized in other examples. For instance, the power sources 112, 114, the conductors 116A-116C, and/or the load 110 can be configured as a three-phase or another poly-phase system in other examples. In a single-phase system, the conductors 116A-116C carry a single electric signal. In a three-phase system, three conductors 116A-116C may each include multiple conductors to facilitate carrying three separate electric signals of the same frequency at different phases.

As also shown in FIG. 1, the transfer switch system 100 includes a switch 118, which selectively connects the primary source 112 or the secondary power source 114 to the load 110. The switch 118 may thus include one or more electrical devices. For example, such additional electrical devices may comprise one or more electromechanical contactors, solid state devices, circuit breaker devices, and/or other suitable devices for electric power transfer. In one example, the switch 118 includes a solenoid that activates an electrical contact to move between a connection to the primary conductor 116A and a connection to the secondary conductor 116B. Other examples are also possible. For examples, such electrical devices may be internal or external to the transfer switch system 100.

In practice, the switch 118 can be operably switched between multiple states. In a first state, the switch 118 can connect the primary power source 112 to the load 110. In a second state, the switch 118 can connect the secondary power source 114 to the load 110.

The switch 118 is selectively switched between the first state and the second state under control of a controller 120. The controller 120 may thus provide control signals to the switch 118, which selectively control the state of the switch 118 to connect either the primary power source 112 or the secondary power source 114 to the load 110. The controller 120 controls the switch 118 based on an analysis of the electric signal transmitted on the primary conductor 116A from the primary power source 112 to the load 110. In particular, the controller 120 monitors the electric signal on the primary conductor 116A for certain conditions, which indicate that it may be beneficial to switch the load 110 from the primary power source 112 to the secondary power source 114 (e.g., an outage of the primary source 112 has or is likely to occur).

To monitor the electric signal on the primary conductor 116A, the controller 120 is coupled to the primary conductor 116A via a first sensor 122. The first sensor 122 may be internal (i.e., integral) or external to the controller 120. The sensor 122 senses the electric signal transmitted on the primary conductor 116A and provides an indication of one or more parameters of the electric signal (e.g., a magnitude of current, voltage, power, etc.) to the controller 120. Similarly, to monitor the electric signal in the secondary conductor 116B, the controller 120 may be coupled to the secondary conductor 116B via a second sensor. The second sensor may be similar in construction and/or function to the first sensor 122. For example, the second sensor may be internal (i.e., integral) or external to the controller 120. Various different types of sensors may be utilized. In one example, the first sensor 122 can include a current transformer coupled to the primary conductor 116A. In such an example, as current flows through the primary conductor 116A, the current transformer induces a current in the sensor 122 that is proportional to the current flowing through the primary conductor 116A. The sensor 122 and/or the controller 120 may then determine from the induced current a voltage or current of the electric signal transmitted on the primary conductor 116A from the primary power source 112 to the load 110. Other examples are also possible.

The controller 120 can be, for example, a microcontroller, a microprocessor, an application specific integrated circuit (ASIC) device, field programmable gate array (FPGA), programmable logic controller (PLC) or the like. In FIG. 1, the controller 120 is further coupled to a memory 124. The memory 124 can store any data required by the controller 120 for detecting conditions of the primary power source 112, initiating a power transfer, or executing any other functionality. For example, the memory 124 can store one or more threshold values 126, 130, one or more time intervals 128, 132, application code (e.g., main functionality firmware), initialization parameters, boot code, code for executing algorithms, code for determining a non-conforming power and/or instability condition, code for setting user defined thresholds for algorithms, check sums to determine whether code is corrupted, lock codes, and/or other data. This data can be stored in the memory 124 at the factory, manually entered via an input/output device (not shown), or remotely downloaded via the input/output device. The memory 124 can be integrated with the controller 120, or the memory 124 can be external and remotely coupled to the controller 120. The memory 124 can be, for example, random access memory (RAM), read only memory (ROM), electronic erasable programmable read only memory (EEPROM), flash memory, or other volatile or non-volatile memory (i.e., non-transitory computer readable media).

III. Example Operations

In line with the discussion above, the controller 120 monitors the electric signal on the primary conductor 116A for certain conditions, which indicate that it may be beneficial to switch the load 110 from the primary power source 112 to the secondary power source 114. The controller 120 is configured or programmed to detect such conditions using the electric signal sensed by the sensor 122 and perhaps data stored in the memory 124 as inputs. For simplicity, operation of the controller 120 is described below in the context of the sensor 122 sensing a voltage of the electric signal (i.e., a voltage signal) on the primary conductor 116A; however, the sensor 122 can additionally or alternatively sense a current or another parameter of the electric signal on the primary conductor 122 as an input for condition detection.

In one aspect, the controller 120 monitors the voltage signal on the primary conductor 116A to detect an instability condition and/or a non-conforming power event. For example, in one exemplary arrangement, the instability condition may be characterized by relatively rapid fluctuations in the voltage signal and may indicate that the primary power source 112 may imminently experience a power outage. The controller 120 may detect the instability condition by detecting when more than a threshold number of fluctuations occur within a predetermined time interval.

In one example, the controller 120 monitors the voltage signal to detect non-conforming power events as previously described herein. As just one example, such non-conforming power condition or event may be a momentary power outage or power dip in which the voltage signal drops below a first threshold value 126 (which may be stored in the memory 124). In some implementations, the controller 120 may detect a non-conforming power event by detecting each time the voltage drops below the first threshold value 126. In other implementations, the controller 120 may detect a non-conforming power event by detecting each time the voltage drops below and then returns above the first threshold value 126.

When the controller 120 detects a non-conforming power event, the controller 120 initiates a timer. The timer begins to count a period of time equal to a first time interval 128 (which also may be stored in the memory 124). While the timer counts to the first time interval 128, the controller 120 continues to monitor the voltage signal and count each time another non-conforming power event occurs. The controller 120 compares the quantity of non-conforming power events detected to a second threshold value 130 to determine whether a threshold number of non-conforming power events have occurred during the first time interval 128.

If, at any time during the first time interval 128, the controller 120 determines that the quantity of non-conforming power events detected is greater than the second threshold value 130, the controller 120 (i) determines that an instability condition exists and (ii) initiates a control sequence to switch the load 110 from the primary power source 112 to the secondary power source 114. The control sequence can involve the controller 120 providing a control signal to the switch 118 to cause the switch 118 to change from the first state to the second state. Additionally or alternatively, the control sequence can involve the controller 120 providing a control signal to the secondary power source 114 to cause the secondary power source 114 to prepare for providing power to the load 110. For instance, responsive to the control signal from the controller 120, the secondary power source 114 can power on, startup, and/or switch from an idle mode to an active mode, among other possibilities.

Whereas, if the controller 120 determines that the quantity of non-conforming power events is less than the second threshold value 130 at the end of the first time interval 128, then the controller 120 can (i) determine that no instability condition exists, (ii) reset the timer, and/or (iii) maintain the switch 118 in the first state.

Figure 2:
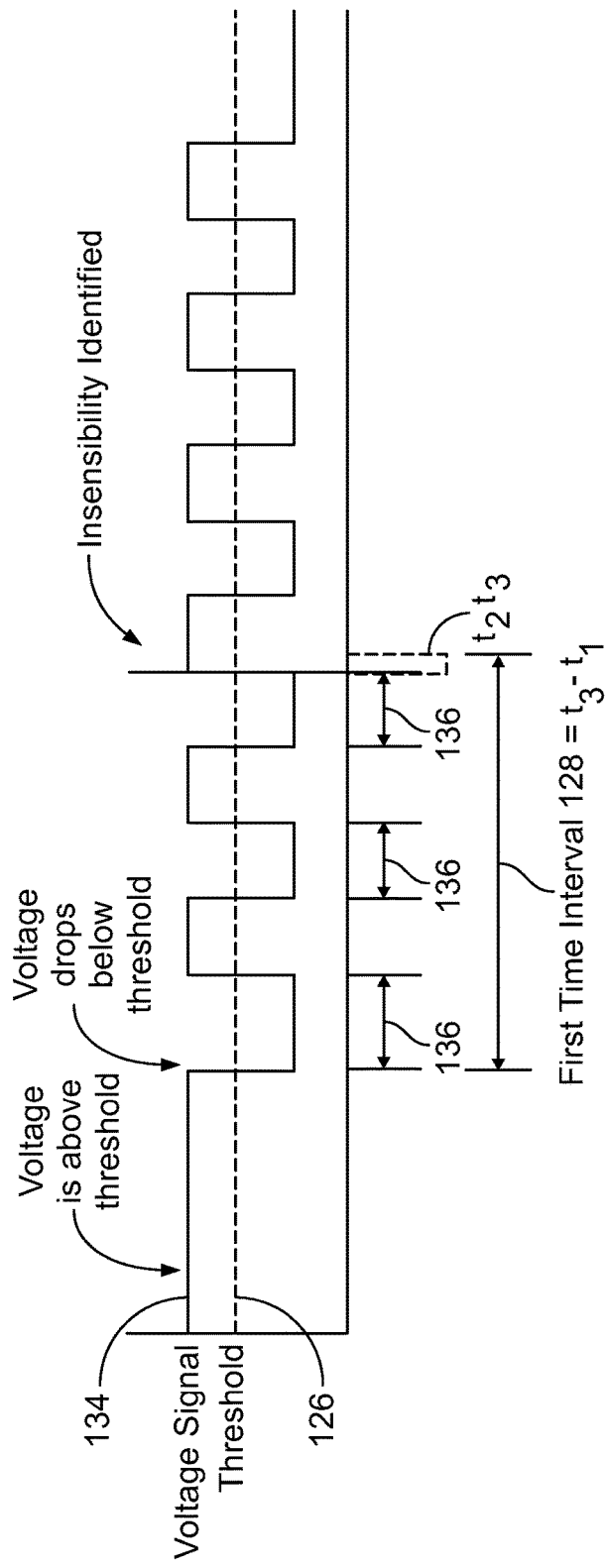
FIG. 2 is a graph depicting a detection of an instability condition according to an example of the disclosure.

FIG. 2 is a graph illustrating a voltage signal 134 exhibiting an instability condition, which can be detected by the controller 120 as described above. As shown in FIG. 2, the voltage signal 134 initially drops below the first threshold value 126 at a time $t_1$. Responsive to the controller 120 detecting this initial voltage signal 134 drop below the first threshold value 126 at time $t_1$, the controller 120 initiates a timer that then counts up to the first time interval 128. In the example shown in FIG. 2, the timer reaches the first time interval 128 at a time $t_3$.

Also, responsive to the controller 120 detecting the initial voltage signal drop below the first threshold value 126 at time $t_1$, the controller 120 initiates a counter for counting non-conforming power events via timer 136 (e.g., by setting the counter to an initial value such as 1). Timer 136 comprises another timer that may be used to determine the duration of what should be considered a monitored non-conforming power event. For example, if timer 136 is set to 1.0 seconds, then a voltage drop below the threshold for 0.5 seconds would not be categorized as a monitored event. However, if the voltage were to drop below the threshold for a duration of 1.5 seconds, such a duration would then be categorized as a monitored event. As such, the timer 136 may be used as a filter to avoid nuisance trips and used to count only events of a predetermined significant enough magnitude. Again, such filter parameters can be tailored to the specific transfer switch application.

Preferably, the timer 128 comprises a rolling timer. For example, such a rolling timer may be able to identify a grouping of events (i.e., a quantity defined by a threshold) that fall within the first time interval 128. Although in certain situations an application may not meet the threshold value 130 number of events that are required within the time interval 128=t3−t1 as shown in FIG. 2, and the control process may still be initiated. As just one example, referring to FIG. 2, assume that a large gap were to be present between the first event 136 and the third event 136 to fall outside the first time interval 128. In such a situation, if a fourth event were to occur in close proximity to the third event 136, then the second, the third and the fourth event would fall within a timer period equal to or less than the time set in the first time interval 128 which would still initiate a control sequence.

While the timer progresses to the first time interval 128, the controller 120 continues to monitor the voltage signal 134 to detect and count the occurrence of additional non-conforming power events 136 (e.g., a number of times the voltage signal 134 returns above the first threshold value 126 and then drops below the first threshold value 126 again). Each time the controller 120 detects a non-conforming power event 136, the controller 120 increments the counter. The controller 120 continues in this manner until either the controller 120 determines that the number of non-conforming power events 136 indicated by the counter exceeds the second threshold value 130 or the timer reaches the first time interval 128 (e.g., at time $t_3$).

In this example, the second threshold value 130 is two non-conforming power events. Accordingly, as indicated in FIG. 2, the controller 120 determines that an instability condition exists at a time $t_2$ based on a determination that three non-conforming power events 136 have occurred within the first time interval 128 at time $t_2$. Accordingly, at time $t_2$, the controller 120 initiates a control sequence to switch the load 110 from the primary power source 112 to the secondary power source 114 as described above.

In another aspect, the controller 120 monitors the voltage signal on the primary conductor 116A to detect a non-conforming power condition. The non-conforming power condition may be characterized by the primary power source 112 providing threshold low (or possibly zero) voltage on the primary conductor 116A for at least a predetermined amount of time. This may, for example, help to mitigate power continuity issues when a power outage has occurred on the primary power source 112.

In one example, to detect a non-conforming power condition, the controller 120 monitors the voltage signal to detect when the voltage signal drops below the first threshold value 126 (stored in the memory 124). Thus, in this example, the threshold value used to detect the non-conforming power condition is the same as the threshold value used to detect an instability condition as described above; however, in alternative examples, the threshold value used to detect the non-conforming power condition can be different than the threshold value used to detect the instability condition.

When the controller 120 detects that the voltage signal drops below the first threshold value 126, the controller 120 then determines whether the voltage signal remains below the first threshold value 126 for a second time interval 132 (which may be stored in memory 124). For example, responsive to the controller 120 detecting that the voltage signal dropped below the first threshold value 126, the controller 120 may initiate a timer. The timer begins to count a period of time equal to a second time interval 132. If the controller 120 determines that the voltage signal returns to a level above the first threshold level 126 before the timer reaches the second time interval 132, the controller 120 (i) determines that no non-conforming power condition exists, (ii) resets the timer, and (iii) maintains the switch 118 in the first state. As a result, the load 110 continues to receive power from the primary power source 112.

Whereas, if the controller 120 determines that the voltage signal remains below the first threshold 126 for the entire second time interval 132, then the controller 120 determines that a non-conforming power condition exists. Responsive to determining that a non-conforming power condition exists, the controller 120 initiates the control sequence to switch the load 110 from the primary power source 112 to the secondary power source 114. As described above, the control sequence can involve the controller 120 providing control signals to the switch 118 and/or the secondary power source 114.

Figure 3:
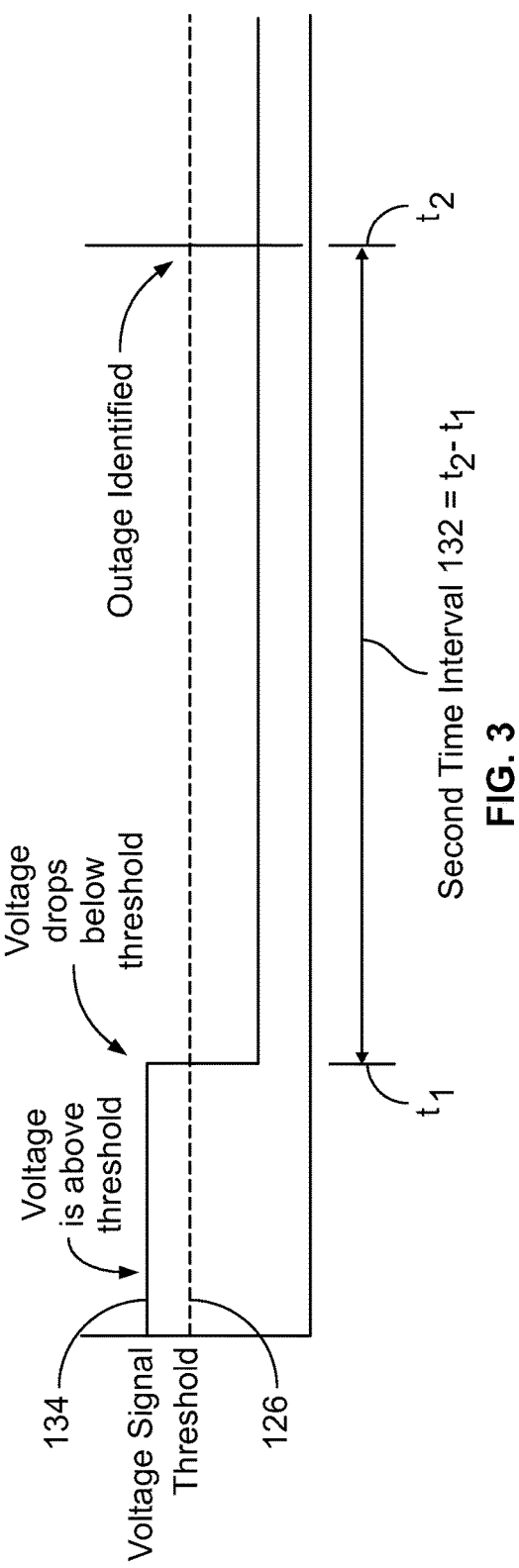
FIG. 3 is a graph depicting a detection of a non-conforming power event or condition according to another example of the disclosure.

FIG. 3 is a graph illustrating a voltage signal 134 exhibiting a non-conforming power condition, which can be detected by the controller 120 as described above. As shown in FIG. 3, the voltage signal 134 drops below the first threshold value 126 at a time $t_1$. Responsive to the controller 120 detecting this voltage signal drop below the first threshold value 126 at time $t_1$, the controller 120 initiates a timer that then counts up to the second time interval 132. In the example shown in FIG. 3, the timer reaches the second time interval 132 at a time $t_2$.

While the timer counts to the second time interval 132, the controller 120 continues to monitor the voltage signal 134 to determine whether the voltage signal 134 returns to a level above the first threshold value 126. At time $t_2$, the controller 120 determines that the voltage signal 134 has remained below the first threshold value 126 for the entire second time interval 132. Accordingly, at time $t_2$, the controller 120 determines that a low power condition exists and responsively initiates a control sequence to switch the load 110 from the primary power source 112 to the secondary power source 114 as described above. Preferably, if at any time during this time interval, the voltage signal 134 rises above the threshold 126, the timer will reset since the voltage signal 134 must remain below the threshold 126 for the entire time interval 132.

According to aspects of the present disclosure, the automatic transfer switch can be operable to detect an instability condition, a non-conforming power condition, or both instability and non-conforming power conditions. Detecting both instability conditions and non-conforming power conditions may provide for more robust protection against power interruptions (or non-conforming power) at the load 110. Notably, the methods for detecting non-conforming power conditions described above generally cannot detect an instability condition as the fluctuations characteristic of the instability condition are generally too brief to be considered a non-conforming power condition (e.g., in which an outage has occurred). However, the methods for detecting instability conditions may beneficially facilitate the controller 120 predicting that a non-conforming power condition is about to occur (or other non-conforming power condition) and thereby allow the automatic transfer switch 100 to take precautionary measures (potentially prior to a loss of primary power actually occurring).

Figure 4:
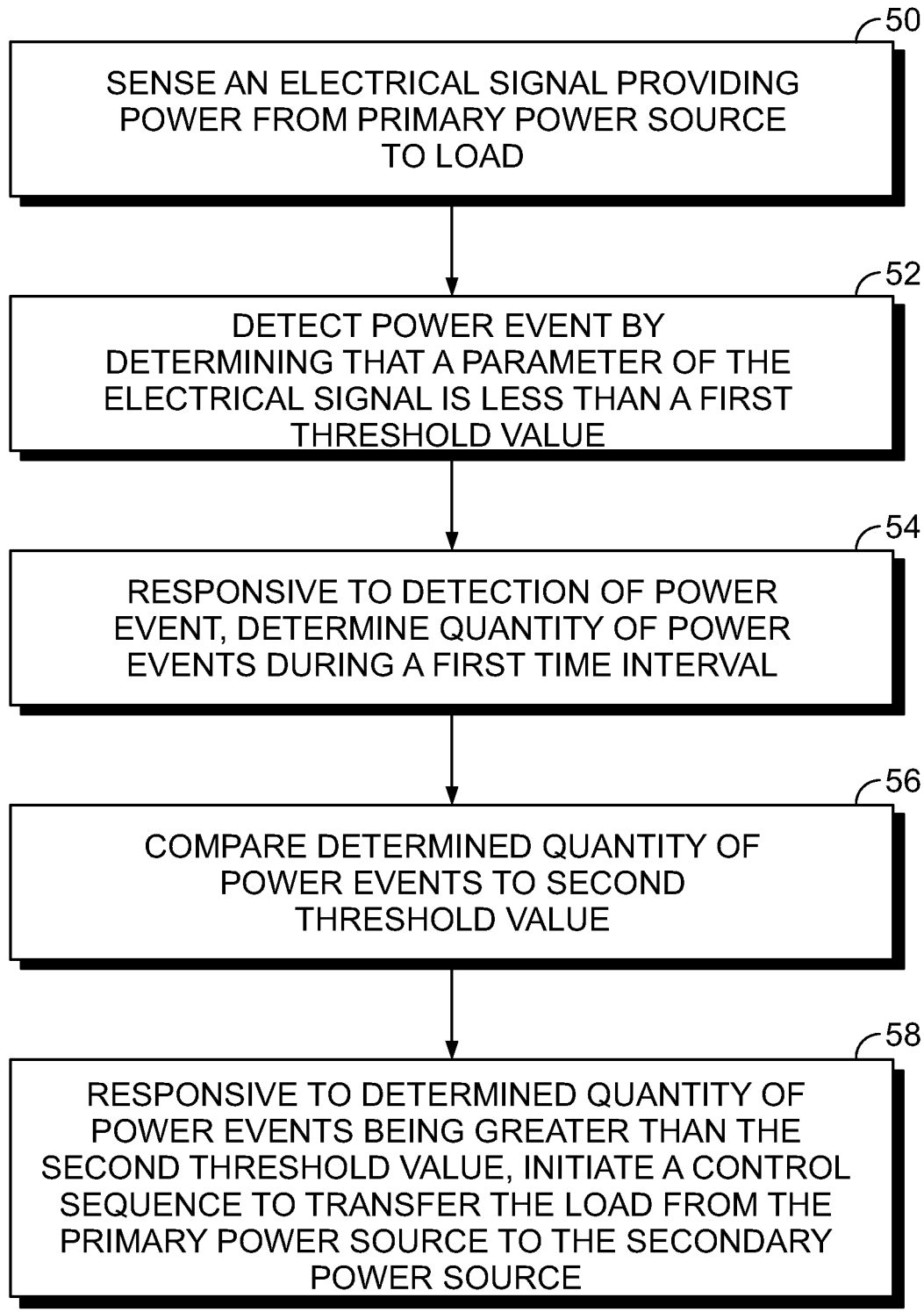
FIG. 4 is a flow chart depicting example operations in accordance with the disclosure.

FIG. 4 is next a flow chart depicting an example set of operations that can be carried out in an implementation of a process in accordance with aspects of the present disclosure. As shown in block 50, the method begins with a controller sensing, via a sensor, an electrical signal providing power from the primary power source to the load. At block 52, the controller detects a non-conforming power event (i.e., designated as a power event) by determining that a parameter of the electrical signal is less than a first threshold value. At block 54, responsive to the detection of the non-conforming power event, the controller determines a quantity of non-conforming power events that occur during a first predetermined time interval. At block 56, the controller compares the determined quantity of non-conforming power events to a second threshold value. At block 58, responsive to the determined quantity of non-conforming power events being greater than the second threshold value, the controller initiates a control sequence to transfer the load from the primary power source to a secondary power source.

Figure 5:
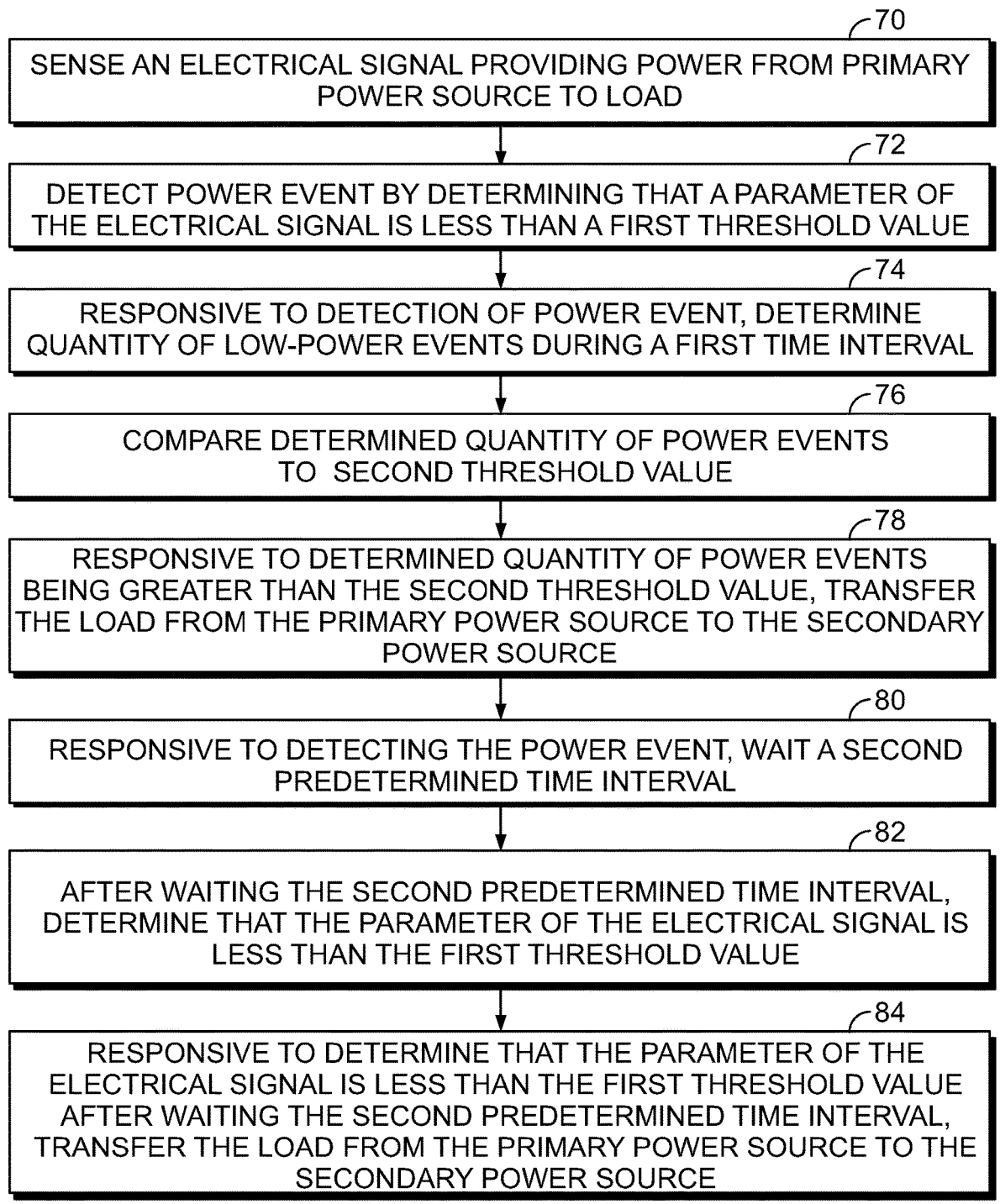
FIG. 5 is another flow chart depicting example operations in accordance with the disclosure.

FIG. 5 is a flow chart depicting another example set of operations that can be carried out in an implementation of a process in accordance with aspects of the present disclosure. As shown in block 70, the method begins with a controller sensing, via a sensor, an electrical signal providing power from the primary power source to the load. At block 72, the controller detects a non-conforming power event (i.e., designated as a power event) by determining that a parameter of the electrical signal is less than a first threshold value. At block 74, responsive to the detection of the non-conforming power event, the controller determines a quantity of non-conforming power events that occur during a first predetermined time interval. At block 76, the controller compares the determined quantity of non-conforming power events to a second threshold value. At block 78, responsive to the determined quantity of non-conforming power events being greater than the second threshold value, the controller initiates a control sequence to transfer the load from the primary power source to a secondary power source.

At block 80, responsive to detecting the non-conforming power event, the controller waits a second predetermined time interval. At block 82, after waiting the second predetermined time interval, the controller determines that the parameter of the electrical signal is less than the first threshold value. At block 84, responsive to determining that the parameter of the electrical signal is less than the first threshold value after waiting the second predetermined time interval, the controller transfers the load from the primary power source to the secondary power source.

IV. Example Variations

As described above, the controller 120 can detect an instability condition exists when a threshold number of fluctuations relative to the first threshold value occur within the first time interval. In some implementations, the instability condition can indicate that the primary power source is currently unstable. Additionally or alternatively, the instability condition can indicate that the primary source is likely to become unstable (i.e., the instability condition can be predictive of the primary power source becoming unstable).

As described above, the instability condition and the non-conforming power condition may be detected by determining when a parameter of the electric signal drops below the first threshold value. In additional or alternative implementations, the first threshold value can be a range of values such that the instability condition and the non-conforming power condition are detected based on a determination of when the parameter of the electric signals is outside the range of values (e.g., drops below a lower boundary or rises above an upper boundary).

According to aspects of the present disclosure, the switch 118 can be configured as an open transfer switch, a delayed transfer switch, a closed transfer switch, an electromechanical transfer switch, a solid state transfer switch, a soft start transfer switch, and/or a static transfer switch. Additionally, although the switch 118 is describe above as having a first state in which the switch 118 connects the primary power source 112 to the load 110 and a second state in which the switch 118 connects the secondary power source 114 to the load 110, the switch 118 may have a third state in which neither the primary power source 112 nor the secondary power source 114 are connected to the load 110 in additional or alternative implementations.

According to further aspects of the present disclosure, the threshold values and/or the time intervals can be predetermined values stored in memory at the time of manufacture and/or based on user input after manufacture. In general, however, the threshold values and the time intervals may be predetermined in the sense that they are set prior to the controller analyzing the electrical signal on the primary conductor. Alternatively, or in addition to such predetermined values, intelligent or automatic self programming of such settings may also be utilized. For example, the controller may be configured to monitor the signal for a predetermined period of time. Based on the quality and/or stability of its power during this monitored period of time, the controller may be configured to use a programmed algorithm to adjust the duration, timers, and/or thresholds of its own settings to adjust higher or lower sensitivities. One advantage of such a smart or intelligent controller is that it would allow the controller to self configure to optimal settings that might be unique to the specific transfer switch application (e.g., such as a hospital, a supermarket, a data center, etc.) and therefore reduce nuisance trips or missing certain events.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method for initiating a transfer of a load between a primary power source and a secondary power source, the method comprising:
    sensing an electrical signal providing power from the primary power source to the load;
    detecting a non-conforming power event by determining that a parameter of the electrical signal is greater than a first threshold value;
    responsive to detecting the non-conforming power event, determining a quantity of non-conforming power events that occur during a first time interval;
    comparing the determined quantity of non-conforming power events to a second threshold value; and
    responsive to the determined quantity of non-conforming power events being greater than the second threshold value, generating a control signal.

2. The method of claim 1 further comprising initiating a transfer of the load.

3. The method of claim 1 further comprising transferring the load from the primary power source to the secondary power source.

4. The method of claim 1 further comprising:
    responsive to detecting the non-conforming power event, waiting a second time interval; and
    after waiting the second time interval, determining that the parameter of the electrical signal is less than the first threshold value.

5. The method of claim 4, further comprising:
    responsive to determining that the parameter of the electrical signal is less than the first threshold value after waiting the second time interval,
    transferring the load from the primary power source to the secondary power source.

6. The method of claim 1, wherein the parameter is a voltage of the electrical signal.

7. The method of claim 1 wherein the first threshold value comprises a predetermined value.

8. The method of claim 1 wherein the first time interval comprises a predetermined time interval.

9. The method of claim 1 wherein the first threshold value comprises an adjustable value.

10. The method of claim 1 wherein the first time interval comprises an adjustable time interval.

11. An apparatus for initiating a transfer of a load between a primary power source and a secondary power source, comprising:
    a processor; and
    a memory including computer program code which, when executed by the processor, causes the apparatus to:
        sense an electrical signal providing power from the primary power source to the load;
        detect a non-conforming power event by determining that a parameter of the electrical signal is greater than a first threshold value;
        responsive to detecting the non-conforming power event, determine a quantity of non-conforming power events that occur during a first time interval;
        compare the determined quantity of non-conforming power events to a second threshold value; and
        responsive to the determined quantity of non-conforming power events being greater than the second threshold value, generate a control signal.

12. The apparatus of claim 11, wherein the memory includes program code, which when executed by the processor causes the apparatus to initiate a transfer of the load.

13. The apparatus of claim 11, wherein the memory includes program code, which when executed by the processor causes the apparatus to transfer the load from the primary power source to the secondary power source.

14. The apparatus of claim 11, wherein the memory includes program code, which when executed by the processor causes the apparatus to:
    responsive to detecting the non-conforming power event, wait a second time interval; and
    after waiting the second time interval, determine that the parameter of the electrical signal is less than the first threshold value.

15. The apparatus of claim 14, wherein the memory includes program code, which when executed by the processor causes the apparatus to:
    responsive to determining that the parameter of the electrical signal is less than the first threshold value after waiting the second time interval,
    transfer the load from the primary power source to the secondary power source.

16. The apparatus of claim 11, wherein the parameter is a voltage of the electrical signal.

17. The apparatus of claim 11 wherein the first threshold value comprises a predetermined value.

18. The apparatus of claim 11 wherein the first threshold value comprises an adjustable value.

19. The apparatus of claim 11 wherein the first time interval comprises one of a predetermined time interval or an adjustable time interval.

20. A computer program product comprising a non-transitory computer readable medium having computer readable code stored thereon, which when executed by a processor, causes an apparatus to perform:
    sensing an electrical signal providing power from a primary power source to a load;
    detecting a non-conforming power event by determining that a parameter of the electrical signal is greater than a first threshold value;
    responsive to detecting the non-conforming power event, determining a quantity of non-conforming power events that occur during a first time interval;
    comparing the determined quantity of non-conforming power events to a second threshold value; and
    responsive to the determined quantity of non-conforming power events being greater than the second threshold value, generating a control signal.

\* \* \* \* \*